Feb. 7, 1967 R. M. WARNER, JR., ET AL 3,303,413

CURRENT REGULATOR

Filed Aug. 15, 1963

INVENTORS
Raymond M. Warner, Jr.
Frank R. Carlson

BY Mueller & Aichele

ATTY'S

United States Patent Office 3,303,413

Patented Feb. 7, 1967

3,303,413
CURRENT REGULATOR

Raymond M. Warner, Jr., and Frank R. Carlson, Scottsdale, Ariz., assignors to Motorola, Inc., Chicago, Ill., a corporation of Illinois Filed Aug. 15, 1963, Ser. No. 302,410
6 Claims. (Cl. 323—4)

This invention relates to semiconductive devices and particularly to their use for high level current regulation.

In many electrical systems requiring a moderate to large operating current, it is necessary or desirable that the current supplied be essentially constant and independent of the operating environment. Control devices and circuits used in the past for current regulation at one or more amperes of current have been generally large and inefficient. In most cases, for example, relatively large amounts of power are wasted in their use.

In many of todays more sophisticated applications of current control units, as used in computers, for example, it is necessary that current be extremely well regulated by a unit which is at once small and generates little heat (i.e., wastes little power) in operation.

Accordingly, an object of this invention is to provide a small, efficient control unit capable of a high degree of current regulation at high current levels.

The invention features a current regulating circuit which is partly controlled by closely regulating the emitter-base bias of a junction transistor and which is provided, in accordance with the invention, with a field effect device shunted across the collector and base terminals of the transistor, the effect of which is to greatly increase the current level at which the circuit will regulate current.

The invention also features in the same type of current regulating circuit the use of yet another current regulator circuit shunted across the collector and base terminals of the junction transistor instead of the field effect device in order to further increase the current level at which the circuit will regulate current.

Figure 1:
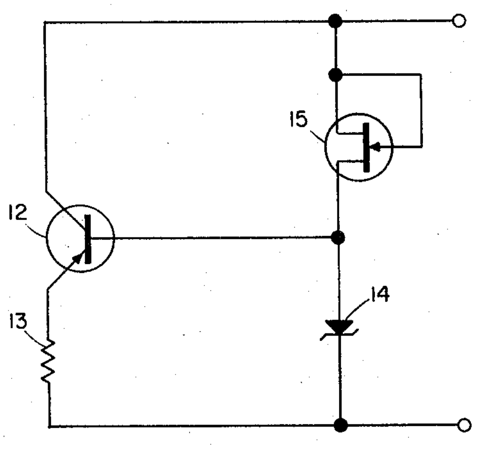
Figure 2:
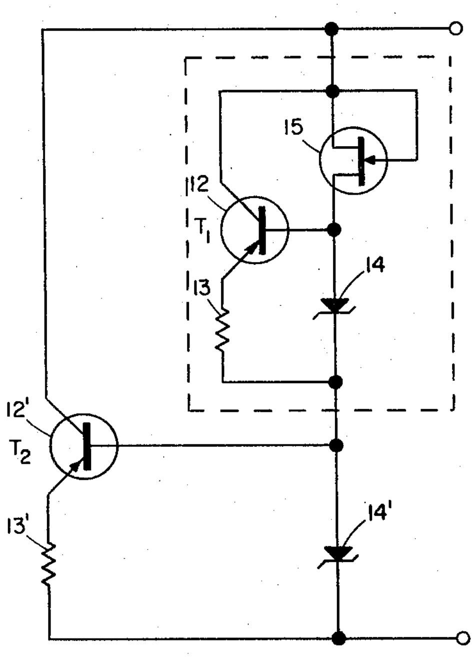

These and other objects and features of the invention will more fully appear in the following description of the accompanying drawing wherein:

FIG. 1 is a circuit embodiment of the current regulator according to this invention, and FIG. 2 is a modification of FIG. 1 and shows a multi-transistor circuit capable of regulating higher current levels than can be regulated by the circuit of FIG. 1.

Current regulation at the amperes level can be achieved in a two-terminal circuit (FIG. 1) using four relatively small components: a power transistor 12, a resistor 13, a low-voltage Zener diode 14 or equivalent, and a field effect device 15 which regulates current at a few milliamperes. The last requirement can be met, for example, by a field effect transistor 15 with gate connected to source or by a current limiter of the type described in the article by R. M. Warner, Jr., et al., "A Semiconductor Current Limiter," Proc. IRE, vol. 47, pp. 44–56, January 1959. In either case the device acts as a current limiter and should have a low pinch-off voltage since this parameter places a lower limit on the voltage at which current regulation by the four-component circuit will commence.

Omitting the field effect transistor or other current limiter from FIG. 1 leaves a prior art circuit which has been widely used for current regulation at a few milliamperes. The upper limit on current in that case is approximately $\beta I_{CBO}$, where $\beta$ is the transistor's D.C. common emitter current gain and $I_{CBO}$ is the collector-to-base leakage current. The current limiter can be regarded as a source of an additional collector leakage current having a current value $I_D$ which thus raises the limit on regulated current to approximately $\beta I_D$. It should be emphasized that choice of the resistor 13 and voltage regulator 14 values fix the current at which regulation actually does occur, while $\beta I_D$ constitutes the upper limit.

Operation of the circuit can be explained as follows: The voltage across the resistor 13 is maintained relatively constant at a value equal to the constant voltage of the Zener diode 14, less the rather constant voltage drop across the emitter of the power transistor 12. The Zener diode must, of course, regulate voltage at a value greater than the voltage drop across the emitter of the transistor. Thus one or several silicon forward diodes in series could be substituted for the Zener diode in a circuit using a germanium power transistor. Since the voltage across the resistor 13 is constant, the emitter current, $I_E$, is constant. The collector current is then $\alpha I_E + I_{CBO}$, where $\alpha$ is the transistor's D.C. common base current gain. Let $I_Z$ be the current through the Zener diode, and let $I_D$ be the current through the current limiter. Clearly the total current through the circuit is equal to the sum of the two branch currents at the top or at the bottom. Equating these two expressions for total current gives $$(\alpha I_E + I_{CBO}) + I_D = I_E + I_Z = I \quad (1)$$

From this, $$I_E = \frac{I_D + I_{CBO} - I_Z}{1-\alpha} \quad (2)$$

Substituting this expression back into the left side of (1) gives for I, the total current, $$I = \frac{\alpha}{1-\alpha}[I_D + I_{CBO} - I_Z] + I_D + I_{CBO} \quad (3)$$

This equation states the maximum current at which the circuit can regulate provided we substitute for $I_Z$ the minimum current at which the zener element can regulate voltage. To set an upper limit on I, let us assume that the zener diode is ideal and therefore that $I_Z$ may be regarded as zero. Then from (3), $$I_{max} = (I_D + I_{CBO})(\beta + 1) \quad (4)$$

If $C_{CBO} << I_D$, as will often be the case, then simply $$I_{max} = I_D(\beta + 1) \approx \beta I_D \quad (5)$$

As total regulated current, I, is diminished continuously from the maximum allowable value by increasing R or decreasing $V_Z$, then the current $I_Z$ increases continuously. From (2) $I_Z$ can be written $$I_Z = (\alpha - I)I_E + I_D + I_{CBO} \quad (6)$$

or $$I_Z = (\alpha - 1)\frac{(V_Z - V_{BE})}{R} + I_D + I_{CBO} \quad (7)$$

where $V_{BE}$ is the base-emitter voltage drop in the transistor. Similarly, the total regulated current is written in terms of fundamental parameters as $$I = \alpha\frac{(V_Z - V_{BE})}{R} + I_D + I_{CBO} \quad (8)$$

In approximate terms, the regulated current $$I \approx \frac{(V_Z - V_{BE})}{R} + I_D \quad (9)$$

From this expression, it is clear that the current limiter supplies an additive current rather than one which is multiplied by other circuit parameters. It is also clear that a variable current regulator in the range below $\beta I_D$ can be realized by making the resistor 13 variable.

It is apparent that the substitution of a resistor for a field effect device would also raise the limit on regulated current. However, good regulation at high current levels cannot be obtained with a resistor since the current flow through the resistor would be several orders of magnitude more sensitive to voltage changes than would be the field effect devices after their regulating or pinch-off voltage has been reached. For current regulation in the vicinity of an ampere, a resistor of a few hundred ohms would be used. This limits the dynamic resistance of the current regulator much as if the resistance were connected directly across the terminals of the regulator. The power dissipated by the regulator is also increased due to the $I^2R$ losses in the resistor. The zener diode is not an ideal voltage regulating device (especially the low voltage types) so that the larger changes in current flow through the zener resulting from the use of the resistor, leads to larger voltage changes across the emitter junction, further degrading the regulating ability of the circuit. Since the emitter current of the transistor varies exponentially with voltage, this degrading effect is relatively severe. All of these effects are magnified when regulation is desired at lower voltages since a lower voltage zener diode and a lower valued resistor would be used.

Reapplying the principles embodied in FIG. 1, we also include a multi-transistor circuit capable of regulating at still higher current levels. This is shown in FIG. 2, the portion of the circuit within the dashed lines is clearly the current regulator of upper limit approximately $\beta I_D$. The circuit within the dashed lines obviously replaces the current limiting device of FIG. 1. Thus, for this circuit the upper limit is approximately the product of the current gain of the power transistor $T_2$ 12' multiplied by the current shunted across collector-to-base of $T_2$, and therefore the current limit is raised to approximately $I_{max} \approx \beta_2 \beta_1 I_D$. Thus by increasing the size of the regulated current shunted between the base and collector of $T_2$, any practical degree of current regulation is possible consistent with the current ratings of the components of the circuit. As before, current regulation below the maximum is possible by adjustment of the resistor 13' in series with the emitter.

The embodiments described thus far utilize PNP transistors. NPN transistors are suitable, however, simply by reversing the polarity of the terminals of the regulator and the polarity of the zener and field effect devices.

The components used in embodiments of this invention are relatively small. The circuit of FIG. 1 could readily be incorporated into a mounting of a size little larger than that required to house the crystalline element of the junction transistor. Using silicon monolithic integrated circuit techniques, a current regulator according to this invention could be mounted in a housing no larger than is required for silicon diodes of the same power handling capabilities.

The embodiments of the invention efficiently provide a high degree of current regulation. For example, the circuit of FIG. 1 will regulate 1.3 amperes to within plus or minus 180 milliamperes over the range of 7 volts to 50 volts using a germanium power transistor having a power dissipation rating of 65 watts with an adequate heat sink, and having a $\beta$ of 100, an epitaxial FET passing a current $I_D$ of 13 milliamps, a 5 ohm-resistor and a zener diode having a breakdown voltage of 6.8 volts.

What is claimed is:

1. A current regulating circuit, including in combination a transistor, means having resistive impedance connected to the emitter of said transistor, a voltage regulator connected between said impedance means and the base of said transistor for providing a regulated voltage across said impedance means and the emitter-to-base portion of said transistor, and an active current regulating device including at least one field effect current limiter for providing in the operation of said circuit a regulated and increased current shunting the collector-base portion of said transistor to increase the current level at which said circuit will regulate current.

2. The current regulating circuit of claim 1 in which said voltage regulator comprises at least one zener diode with said zener diode connected in the direction for normal zener operation.

3. The current regulating circuit of claim 1 in which said voltage regulator comprises at least one semiconductor diode with said semiconductor diode connected in the forward direction.

4. A current regulator circuit comprising a triode junction transistor, resistance means connected to the emitter of said transistor, a zener diode connected between said resistance means and the base of said transistor for regulating voltage across said resistance means and the emitter-to-base portion of said transistor, and a field effect current limiter connected between the base and the collector of said transistor for providing in the operation of said circuit a regulated and increased current shunting the collector-to-base portion of said transistor in order to increase the level at which said circuit will regulate current.

5. The current regulator circuit of claim 4 in which said current limiter constitutes a field effect transistor.

6. A current regulator circuit, including in combination a first triode junction transistor, impedance means having resistance connected to the emitter of said transistor, a semiconductor voltage regulating device connected between said impedance means and the base of said transistor for regulating voltage across said impedance means and the emitter-to-base portion of said transistor, and a current regulating device connected between the base and the collector of said transistor, said current regulating device comprising a second triode junction transistor having an emitter, a base, and a collector, resistance means connected to the emitter of said second triode junction transistor, a zener diode connected between said resistance means and the base of said second triode junction transistor for regulating the voltage across the resistance means and the emitter-to-base portion of said second triode junction transistor, and a field-effect current limiter connected between the base and the collector of said second triode junction transistor for providing a regulated and increased current shunting the collector-to-base portion of said first triode junction transistor thereby enabling said circuit to regulate a maximum current which is approximately equal to the current through said field-effect current limiter multiplied by the current gains of said first and second triode junction transistors.

References Cited by the Examiner

UNITED STATES PATENTS

| | | | |
|---|---|---|---|
| 2,967,991 | 1/1961 | Deuitch | 323—22 |
| 3,069,617 | 12/1962 | Mohler | 323—22 |
| 3,114,872 | 12/1963 | Allard | 323—4 |
| 3,222,610 | 12/1965 | Evans | 330—38 |
| 3,246,233 | 4/1966 | Herz | 323—4 |

JOHN F. COUCH, *Primary Examiner.*

W. E. RAY, *Assistant Examiner.*